July 1, 1958  W. L. DUNCAN ET AL  2,841,048
YARN DEFECT MONITOR
Filed April 29, 1954
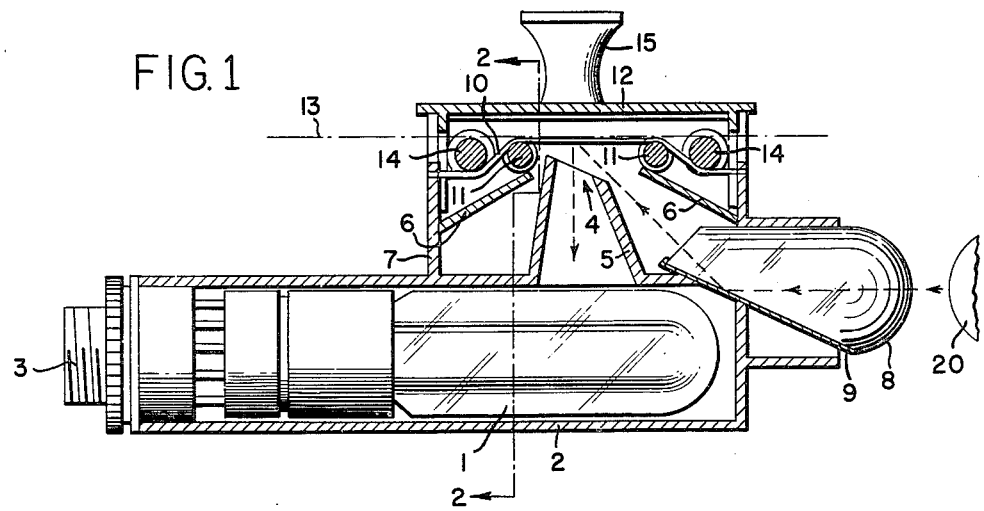
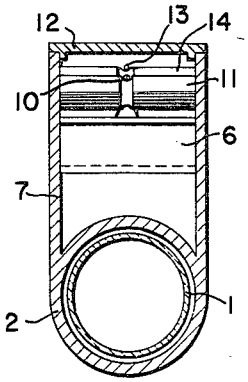
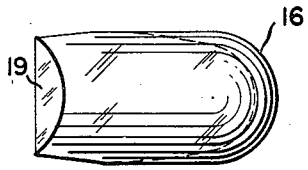
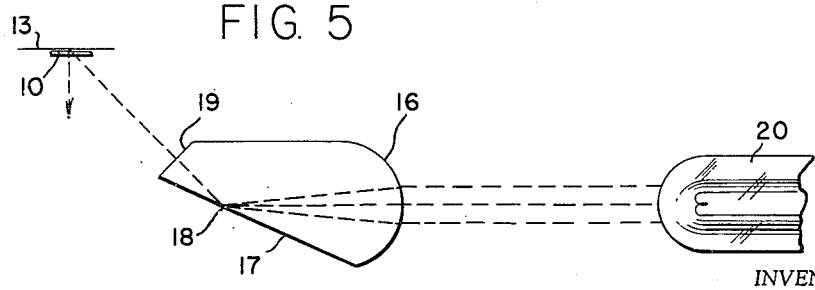
INVENTORS
WILLIAM LANKFORD DUNCAN
GEORGE HILLIARY HUTCHENS
BY Carl A. Hechmer
ATTORNEY

United States Patent Office 2,841,048
Patented July 1, 1958

2,841,048

YARN DEFECT MONITOR

William Lankford Duncan and George Hilliary Hutchens, Waynesboro, Va., assignors to E. I. du Pont de Nemours & Company, Wilmington, Del., a corporation of Delaware Application April 29, 1954, Serial No. 426,534

2 Claims. (Cl. 88—14)

This invention relates to a defect observation device for moving funicular structures. More particularly it is concerned with an apparatus useful in detecting defects such as broken filaments, strip backs or fluff balls in a running filament yarn.

It is an object of the present invention to provide a process for detecting defects in a moving funicular structure.

Another object is to provide apparatus which is suitable for detecting defects in a moving funicular structure.

A further object is to provide a one-piece lens and prism structure capable of converging scattered light into a light-locked compartment in a unidirectional beam.

These and other objects will become apparent in the course of the following specification and claims.

It has long been the practice of the textile industry to visually inspect a warp of yarn while it is being beam-wound, counting the number of defects. In accordance with the present invention apparatus is provided which permits the automatic detecting of defects in yarn or other funicular bodies.

The invention will be more readily understood by reference to the drawings.

Figure 1 is a sectional elevation of the apparatus;

Figure 2 is a sectional elevation across line 2—2 of the apparatus shown in Figure 1;

Figure 3 is a top view of the one-piece lens and prism structure;

Figure 4 is an end view of the one-piece lens and prism structure;

Figure 5 is a side view of the one-piece lens and prism structure illustrating its light converging and directing functions.

Figure 1 illustrates the assembled apparatus in a sectional elevation. It consists of a photo-electric tube 1 in a housing 2 provided with a phototube cable connector 3 and containing an aperture 4 through which the said tube may be triggered. The aperture is protected from extraneous lateral light by a light-lock provided by tubular light shield 5 and planar light shields 6. A rectangular housing 7 having an open top is mounted upon photo-tube housing 2 around aperture 4 and shields 5 and 6 of the lateral light-lock. An aperture is provided in housing 7 between tubular light shield 5 and planar light shield 6 into which a lens and prism system 8 in a suitable mounting 9 can be fitted to convey a unidirectional beam of light into the observation chamber. A non-reflecting shadow bar 10 is rigidly fixed at each end to housing 7 in a manner that it passes across aperture 4 at a spot within the path of the unidirectional light beam introduced by system 8. Further rigidity is provided to shadow bar 10 in the region contiguous to aperture 4 of tubular light shield 5 by means of transverse shadow bar supports 11. A closure 12, having a knob 15, is telescoped into housing 7 shielding aperture 4 from vertical light. The observation chamber is thus light-locked except for the unidirectional beam introduced by system 8. The closure 12 may be raised or lowered with reference to housing 7. A small opening is provided at each side of closure 12 to permit a funicular structure 13 to be passed through it. Two guides 14 are provided rigidly fixed to housing 7 to support and guide the funicular structure 13 so as to place the funicular structure directly above and parallel with shadow bar 10 when closure 12 is in place. The light from source 20 is directed as a unidirectional beam onto the lower side of shadow bar 10 by means of a lens and prism system 8. In operation as the funicular structure travels through the openings in the closure it normally remains within the umbra created by the shadow bar interrupting the unidirectional beam of light. Normally, since the shadow wire is non-reflecting, i. e., it is painted black, none of the undirectional light reflects through the photo-tube triggering aperture. However any protrusions from the funicular structure, such as for instance in yarns having broken filaments, strip backs or fluff balls, will protrude into the illuminated area and cause reflected light to pass through the phototube triggering aperture. Each such reflection excites the photo-electric tube which in turn registers upon a suitable electronic or mechanical counter, either of which may be linked to a recording system.

Figure 2 is a sectional elevation of the apparatus of Figure 1 taken across line 2—2. in this view the relative positions of the various components as identified above is emphasized.

Figures 3 and 4 are top and end views of the one piece lens and prism system. As is apparent from these illustrations, as well as the side view of Figure 5, the structure combines a spherical light collecting surface 16 with a reflecting surface 17 at the secondary focal point 18 of the said spherical surface and a light emissive surface 19 which emits the focused unidirectional light beam. The one-piece lens and prism system thus serves the purpose of concentrating external lateral light source rays and deflecting them as a beam against the shadow wire and any protrusions from the funicular structure. It is preferred that the one-piece lens and prism system as described be molded or machined from acrylic polymer. However, other transparent polymer or glass with the reflecting surface mirrored may be employed. A conventional multi-part lens and prism system can be substituted if desired.

The nature of the funicular structure is not critical. In general the device may be employed in observing any filamentary type material. Thus it is useful in the manufacture of wire. It is also suitable for observing continuous filaments of yarns of man-made fibers. Spun yarns such as wool, cotton and the like are also adaptable. The principle may be applied in the examination of sheet-like material by obvious suitable modifications of the shadow producing element.

Usually for yarn observation the shadow bar will be a wire of relatively heavy gauge. Adjustment to different denier yarn can be made by controlling the distance from shadow bar to yarn by adjustment of the guide within the housing or by changing the shadow bar cross-sectional dimension. In general a 20 gauge wire is suitable for measuring yarns having diameters ranging from about 0.005 to about 0.012 inch. A running warp of yarn may be observed by a parallel array of the devices described, one being employed for each yarn end. Furthermore several yarn ends may be inspected within the same housing by providing one shadow bar for each yarn end.

Many modifications within the inventive concept will be apparent to those skilled in the art from a reading of the above without a departure from the inventive concept.

What is claimed is:

1. A device for detecting defects in a funicular structure comprising an observation chamber, with openings at each side adapted to permit continuous passage of the said funicular structure therethru, supporting and guiding means for the said funicular structure within the said chamber adapted to provide a straight line of passsage for the said funicular structure between the said openings in the said observation chamber, a non-reflecting shadow bar rigidly fixed in the said chamber positioned below and parallel to the line of passage of the said funicular structure, one side of said chamber having a light entrance aperture below one of said openings, a light source adapted to direct light through said entrance aperture toward the under side of the said shadow bar directly opposite to the side of passage of the said funicular structure and disposed to form an umbra with the said shadow bar through which said funicular structure passes, a photo-electric detection means positioned below the shadow bar and directed toward the illuminated side of the said non-reflecting shadow bar, a light shield means positioned around the photo-electric detection means to shield the latter from all light except that reflected by surfaces of the funicular structure protruding beyond the umbra of the said shadow bar, the said photo-electric detection means being sensitive to light reflected by protrusions on the said funicular structure which extend beyond the said umbra of the shadow bar, to thereby give an indication of any defect in the funicular structure 2. The device of claim 1 wherein the light source is directed through the said light entrance aperture to illuminate the said shadow bar by means of a one-piece lens and prism system having a spherical light collecting surface, a light reflecting surface at the secondary focal point of the said spherical surface and a light exit surface disposed to transmit the reflected focused light.

References Cited in the file of this patent

UNITED STATES PATENTS

| | | |
|---|---|---|
| 1,712,112 | Keuffel | May 7, 1929 |
| 2,119,542 | Kaspereit | June 7, 1938 |
| 2,413,486 | Denyssen | Dec. 31, 1946 |
| 2,520,936 | Ingham | Sept. 5, 1950 |
| 2,682,191 | Anderson | June 29, 1954 |